United States Patent [19]

Yoldas et al.

[11] Patent Number: 4,814,017
[45] Date of Patent: Mar. 21, 1989

[54] AQUEOUS ORGANOALKOXYSILANE/METAL OXIDE SOL-GEL COMPOSITIONS

[75] Inventors: Bulent E. Yoldas, Pittsburgh; Chia-Cheng Lin, Gibsonia, both of Pa.

[73] Assignee: PPG Industries, Inc., Pittsburgh, Pa.

[21] Appl. No.: 915,346

[22] Filed: Oct. 3, 1986

[51] Int. Cl.$^4$ .................... C09K 3/00; C08G 79/00
[52] U.S. Cl. .................... 106/287.12; 106/287.14; 106/287.16; 106/287.19; 106/287.24; 528/395
[58] Field of Search .................... 106/287.19, 287.12, 106/287.14, 287.16, 287.24; 528/395

[56] References Cited

U.S. PATENT DOCUMENTS

| | | | |
|---|---|---|---|
| 2,689,858 | 9/1954 | Boyd | 528/395 |
| 2,769,732 | 11/1956 | Boyd | 106/287.19 |
| 3,004,863 | 10/1961 | Gray et al. | 427/384 |
| 3,412,063 | 11/1968 | Jarbue et al. | 106/287.19 |
| 3,582,395 | 6/1971 | Adams et al. | 428/412 |
| 3,941,719 | 9/1973 | Yoldas | 242/463 |
| 3,944,658 | 3/1976 | Yoldas | 423/626 |
| 3,986,997 | 10/1976 | Clark | 264/29.2 |
| 4,027,073 | 5/1977 | Clark | 428/412 |
| 4,208,475 | 6/1980 | Paruso | 429/193 |
| 4,242,403 | 12/1980 | Mattimoe et al. | 428/213 |
| 4,244,986 | 1/1981 | Paruso et al. | 427/126.4 |
| 4,271,210 | 6/1981 | Yoldas | 427/169 |
| 4,275,118 | 6/1981 | Baney | 428/412 |
| 4,278,632 | 7/1981 | Yoldas | 264/66 |
| 4,286,024 | 8/1981 | Yoldas | 428/446 |
| 4,293,594 | 10/1981 | Yoldas | 427/163 |
| 4,346,131 | 8/1982 | Yoldas | 428/428 |
| 4,357,427 | 11/1982 | Ho | 501/153 |
| 4,390,373 | 6/1983 | White et al. | 106/287.12 |
| 4,405,679 | 9/1983 | Fujioka et al. | 428/413 |
| 4,442,168 | 4/1984 | White et al. | 428/331 |
| 4,477,499 | 10/1984 | Doin et al. | 427/412.1 |
| 4,500,669 | 2/1985 | Aschlock et al. | 524/440 |
| 4,568,578 | 2/1986 | Arfsten et al. | 428/34 |
| 4,571,365 | 2/1986 | Aschlock et al. | 428/412 |

FOREIGN PATENT DOCUMENTS 0128697 12/1984 European Pat. Off. .
0170295  5/1986 European Pat. Off. .
1494209 12/1977 United Kingdom .

OTHER PUBLICATIONS

Physics of Thin Films, vol. 5, G. Haas and Re Thun eds., Ch. 3, Academic Press, 1969; H. Schroeder.
Klein et al., "Inhibition of Photoinitiated Degradation of Polycarbonate by Cerium Sulfate".
Philipp et al, "New Materials for Contact Lens . . .", Journal on Non-Crystalline Solids.
Huang et al., "Ceramers", *Polymer Bulletin*, No. 14 (1985), pp. 557–564.

*Primary Examiner*—Theodore Morris
*Attorney, Agent, or Firm*—Donna L. Seidel

[57] ABSTRACT

A method is disclosed for making an organoalkoxysilane/metal oxide sol-gel composition in an essentially aqueous medium by partially hydrolyzing an organoalkoxysilane with a limited amount of water which is essentially completely consumed in the hydrolysis reaction, adding a metal alkoxide of titanium or zirconium to the essentially anhydrous partially hydrolyzed organoalkoxysilane, completely reacting the metal alkoxide with the partially hydrolyzed organoalkoxysilane to form an oxide network and then completely hydrolyzing the composition in water.

10 Claims, No Drawings

AQUEOUS ORGANOALKOXYSILANE/METAL OXIDE SOL-GEL COMPOSITIONS

FIELD OF THE INVENTION

The present invention relates generally to the art of sol-gel coating compositions, and more particularly to the art of sol-gel coating compositions which produce abrasion-resistant coatings.

BACKGROUND

U.S. Pat. No. 3,004,863 to Gray et al teaches increasing the scratch resistance of glass by applying to the glass surface an acidic aqueous solution of an organic titanate ester composition and heating at a temperature sufficient to anneal the glass.

U.S. Pat. No. 3,582,395 to Adams et al discloses a method for increasing the scratch resistance of glass by treating the surface at a temperature between the strain point and the softening point with an alkylsilyl titanate to form a protective coating of silica-titania.

U.S. Pat. Nos. 3,986,997 and No. 4,027,073 to Clark disclose an acidic dispersion of colloidal silica and hydroxylated silsesquioxane in an alcohol-water medium coated onto substrates such as acrylic lenses to provide an abrasion-resistant coating.

U.S. Pat. No. 4,242,403 to Mattimoe et al describes multi-layer automotive glazing units that include transparent substrates with protective covers, and that combine penetration resistant body portions with abrasion resistant surfaces of a silica-reinforced organopolysiloxane.

U.S. Pat. Nos. 4,390,373 and No. 4,442,168 to White et al describe a coating composition comprising an effective abrasion resisting amount of a colloidal dispersion containing colloidal antimony oxide and colloidal silica in a water-alcohol solution of the partial condensate of an organosilanol which upon curing forms an improved transparent, abrasion-resistant coating.

U.S. Pat. Nos. 4,500,669 and 4,571,365 to Ashlock et al disclose transparent, abrasion-resistant coating compositions comprising a colloidal dispersion of a water-insoluble dispersant in a water-alcohol solution of the partial condensate of silanol wherein the dispersant comprises metals, alloys, salts, oxides and hydroxides thereof.

U.S. Pat. No. 4,278,632 to Yoldas discloses a method of forming a clear vitreous gel of silica-titania binary by preparing a clear organic solvent solution of partially hydrolyzed alkoxide of either silicon or titanium and then adding the other element in the form of alkoxide or a clear organic solvent solution of partially hydrolyzed alkoxide. The components are reacted and additional water is added to complete hydrolysis. The resulting product is then dried and heated to remove residual organic material.

U.S. Pat. No. 4,346,131 to Yoldas discloses polymerized solutions for depositing optical oxide coatings prepared by reacting metal alkoxide with a mixture of critical amounts of water and/or acid in an alcohol medium. The alkoxides may be titanium, tantalum and/or silicon.

U.S. Pat. No. 4,405,679 to Fujioka et al discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titanium comounds, and a curing catalyst.

U.S. Pat. No. 4,477,499 to Doin et al discloses ultraviolet radiation resistant silicone resin coating compositions having improved thermoformability and shortened required aging achieved by the addition of a Lewis acid compound.

SUMMARY OF THE INVENTION

The present invention provides a method for incorporating metal such as titanium or zirconium into the polymer network structure of an organoalkoxysilane in an aqueous medium. The method of the present invention involves initial partial hydrolysis of the organoalkoxysilane, reaction of a metal alkoxide of titanium or zirconium with essentially anhydrous partially hydrolyzed organoalkoxysilane, and final complete hydrolysis of the sol-gel composition. The aqueous compositions of the present invention deposit harder, more abrasion-resistant, and higher optical quality coatings than prior organic solvent compositions.

DETAILED DESCRIPTION OF THE PREFERRED EMBODIMENT

An aqueous composition of organoalkoxysilane and metal alkoxide is prepared by first partially hydrolyzing an organoalkoxysilane with water A less than equivalent quantity of water is added to an organoalkoxysilane of the general formula $R_xSi(OR')_{4-x}$ wherein R is an organic radical, R' is a low molecular weight akyl radical, and x is at least one and less than four. Preferably x is one, so that the organoalkoxysilane has three hydrolyzable sites. Partial hydrolysis requires, in this case, less than three moles of water per mole of monomeric organoalkoxysilane. Preferably, about one mole of water is added to partially hydrolyze the preferred organoalkoxysilane according to the following general reaction

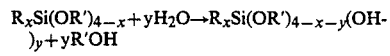

Because the organoalkoxysilane and water are immiscible, a small amount of cosolvent is preferably added. Preferably, a small amount of alcohol is added to promote miscibility and, if necessary, a small amount of catalyst such as nitric acid to accelerate hydrolysis. Preferred organoalkoxysilane are those wherein x is 1, R is selected from the group consisting of lower (preferably one to six carbon) alkyl or vinyl, methoxymethyl, phenyl, γ-glycidoxypropyl and γ-methacryloxypropyl and R' is selected from the group consisting of methyl, ethyl, propyl and butyl. Mixtures of organoalkoxysilanes may be preferred. It is crucial to the practice of the invention that during the initial partial hydrolysis of the organoalkoxysilane, essentially all of the water is consumed in the hydrolysis step. It is also crucial that the partially hydrolyzed organoalkoxysilane cannot be allowed to stand so long that the condensation polymerization reactions

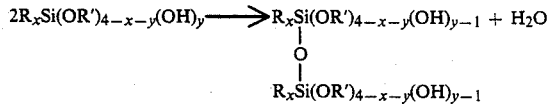

-continued
or

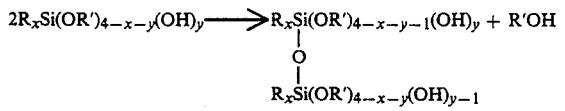

proceed to eliminate active silanol groups needed for reaction with the titanium or zirconium alkoxides to be added.

The second step involves incorporation of metal ions into the organalkoxysilane network by the addition of a metal alkoxide of the general formula $M(OR'')_z$ wherein M is preferably titanium or zirconium, $R''$ is a low molecular weight alkyl radical, preferably containing two to four carbons, and z is the valence of M. The metal alkoxide may comprise an alkyl or aryl radical and may be in dimer or higher condensed form so long as the alkoxide contains hydrolyzable groups reactive with silanol groups to copolymerize. Because titanium and zirconium alkoxides also hydrolyze in water, and form hydroxide species which precipitate from an aqueous medium, the titanium or zirconium alkoxide must be added to the partially hydrolyzed organoalkoxysilane in the essential absence of water. The addition of titanium or zirconium alkoxide to the partially hydrolyzed organoalkoxysilane results in the copolymerization of an inorganic oxide network wherein titanium or zirconium ions are interspersed with silicon according to the following general reaction

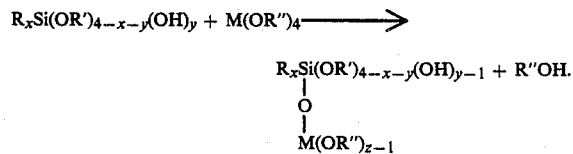

The copolymerization reaction must proceed essentially to completion, i.e., essentially all the titanium or zirconium alkoxide must be reacted into the polymer network. Titanium or zirconium may also be introduced into the partially hydrolyzed organoalkoxysilane in the form of clear polymer solutions wherein hydrolyzable alkoxy groups remain reactive with silanol groups of the partially hydrolyzed organoalkoxysilane.

The final step involves addition of a large quantity of water to essentially completely hydrolyze the composition, i.e., all remaining hydrolyzable groups of either the silane or the titanium or zirconium alkoxide are hydrolyzed according to the general reaction:

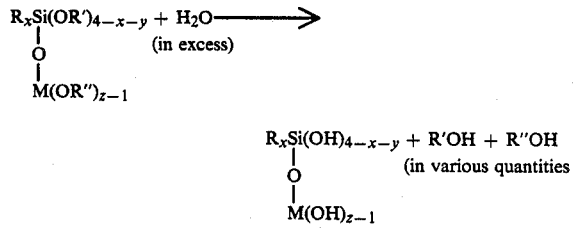

Because any unincorporated titanium or zirconium alkoxide would hydrolyze to form insoluble hydroxides which would precipitate from the aqueous medium, the water must be added in the essential absence of unreacted titanium or zirconium alkoxide.

The resultant composition is an essentially aqueous organoalkoxysilane/metal oxide sol-gel composition which may be dried and cured to form an inorganic oxide network according to the following condensation polymerization reaction

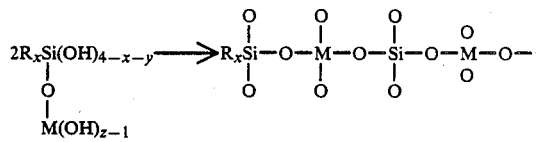

wheren silicon and metal ions are proportionately dispersed throughout the oxide network. The siloxane/metal oxide polymer may be in the form of a monolithic article, or may be applied as a coating composition to the surface of a substrate to form a glassy film. Applied to a plastic substrate such as polycarbonate or acrylic, a silane/metal oxide coating of the present invention has superior abrasion resistance to that of a silane/alumina or other organic solvent based abrasion resistant coating.

The present invention will be further understood from the descriptions of specific examples which follow.

EXAMPLE I

An aqueous organoalkoxysilane/titania composition is prepared as follows. First, to 100 grams of γ-glycidoxypropyl trimethoxysilane are added 40 grams of 2-propanol, 8 grams of deionized water and 10 drops of nitric acid. The mixture is stirred for 15 minutes to complete the partial hydrolysis of organoalkoxysilane without allowing significant condensation polymerization. Next is added 30 grams of tetraethyl titanate. Stirring is continued for 30 minutes to ensure complete reaction of the titanate with the partially hydrolyzed organoalkoxysilane. Finally added are 170 grams of deionized water and 2 grams of ammonium perchlorate to completely hydrolyze the composition. Stirring is continued until a clear sol is formed. Before the composition is applied as a coating, 2 drops of surfactant may be added to promote wetting. A suitable surfactant is Zonyl FSN from DuPont.

A polycarbonate substrate ⅛ inch (about 3 millimeters) thick is primed with an aminosilane by dipping for 7 minutes in A-1120 from Union Carbide, rinsing with 2-propanol then water, and drying for 30 minutes at 60° C. to 80° C. The primed substrate is dipped into the above-described composition for 1 minute. After air-drying for half an hour, the coating is heated from 40° C. to 130° C. over a period of one hour and held at 130° C. for 3 hours to cure the coating. After cooling to room temperature, the coated substrate's optical properties are measured as 88.9 percent transmittance and 0.3 percent haze. After Bayer abrasion testing of 300 cyclces with 1000 grams of quartz sand 6 to 14 mesh size according to ASTM F-735, the optical properties of the coated substrate are 88.8 percent transmittance and 2.1 percent haze, compared to 60 to 65 percent haze for uncoated polycarbonate after 300 cycles of Bayer abrasion testing.

EXAMPLE II

Another organosilane/titania composition is prepared as in Example I except that 39.4 grams of tetrapropyltitanate is used as the titanium alkoxide. The composition is applied, dried and cured to form a coating as in Example I. After 300 cycles of Bayer abrasion testing, the coated substrate measures 3.4 percent haze, compared to 60 to 65 percent haze for uncoated polycarbonate after 300 cycles of Bayer abrasion testing.

EXAMPLE III

A third silane/titania composition is prepared as in the previous examples except that it comprises 47.1 grams of tetrabutyl titanate. The composition is applied, dried and cured as in the previous examples. After 300 cycles of Bayer abrasion, the coated substrate has 3.8 percent haze, compared to 60 to 65 percent haze for uncoated polycarbonate after 300 cycles of Bayer abrasion testing.

EXAMPLE IV

From the above examples, it was determined that tetraethyl titanate would be chosen for further experiments to optimize the Si/Ti ratio. A series of compositions was prepared as in the previous examples except with different proportions of tetraethyl titanate All were applied, dried and cured as in the previous examples, and haze after Bayer abrasion measured. The following results were obtained.

| Tetraethyl Titanate (grams/100 grams silane) | 303 Cycles Bayer Abrasion (% Haze) |
| --- | --- |
| 15 | 4.1 |
| 20 | 2.4 |
| 25 | 2.1 |
| 30 | 1.8 |
| 43 | 1.8 |
| 55 | 1.8 |
| 71 | 2.5 |

From this example it was determined to use between 25 and about 60 grams, preferably about 40 grams, of tetraethyl titanate per 100 grams of γ-glycidoxypropyl trimethoxysilane.

EXAMPLE V

This example describes the composition which has provided the best abrasion resistance, as measured by percent haze after 300 cycles of Bayer abrasion testing. A mixture of 100 grams of γ-glycidoxypropyl trimethoxysilane, 20 grams of ethanol, 8 grams of deionized water and 0.3 grams of nitric acid is stirred for 8 minutes. Then 40 grams of tetraethyl titanate is added, and the mixture is stirred for an additional 10 minutes. Finally, 185 grams of water is added. The composition is applied, dried and cured as in the previous Examples. After 300 cycles of Bayer abrasion the coated substrate exhibits only 1.0 percent haze, comparing favorably with glass which has about 0.7 percent haze after Bayer abrasion testing.

The above examples are offered to illustrate the present invention. Various organolkoxysilanes and titanium or zirconium alkoxides may be used in a wide range of proportions and concentrations and cured using different temperatures and cycles. Any wetting agents, flow control or other additives compatible with the compositions may be employed in any amount which does not interfere with network formation. Various substrates may be coated with compositions of the present invention, the scope of which is defined by the following claims.

I claim:

1. A method of making an organoalkoxysilane/metal oxide sol-gel composition in an aqueous medium comprising the steps of:
   a. adding a less than equivalent quantity of water to an organoalkoxysilane of the general formula $$R_xSi(OR')_{4-x}$$

wherein R is an organic radical, R' is a low molecular weight alkyl radical, and x is at least one and less than 4;
   b. partially hydrolyzing said organoalkoxysilane according to the general reaction $$R_4Si(OR')_{4-x} + yH_2O \rightarrow R_xSi(OR')_{4-x-y}(OH)_y + yR'OH$$

wherein y is at least one and less than 4−x, until said quantity of water is essentially completely reacted;
   c. adding to said essential anhydrous partially hydrolyzed organoalkoxysilane a metal alkoxide of the general formula $M(OR'')_z$ wherein M is a metal selected from the group consisting of titanium and zirconium, R'' is a low molecular weight alkyl radical, and z is the valence of M;
   d. reacting said metal alkoxide with said partially hydrolyzed organoalkoxysilane according to the following general reaction

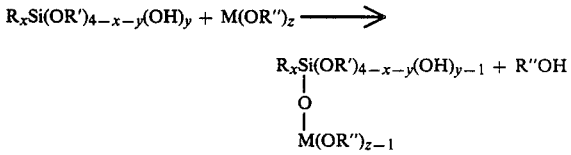

until substantially all of said metal alkoxide has reacted with said partially hydrolyzed organoalkoxysilane to form an oxide network; and
   e. adding sufficient water to essentially completely hydrolyze said composition to form an aqueous sol.

2. A method according to claim 1, wherein the organoalkoxy is selected from the group of $R_xSi(OR')_{4-x}$ wherein R is selected from the group consisting of alkyl, vinyl, methoxyethyl, phenyl, γ-glycidoxypropyl and γ-methacryloxypropyl.

3. A method according to claim 2, wherein said organoalkoxysilane is selected from the group $R_xSi(OR')_{4-x}$ wherein R' is selected from the group consisting of methyl, ethyl, propyl and butyl.

4. A method according to claim 3, wherein R is methyl and R' is ethyl.

5. A method according to claim 4, wherein x is 1.

6. A method according to claim 1, wherein the organoalkoxysilane comprises γ-glycidoxypropyltrimethoxysilane.

7. A method according to claim 1, wherein M is selected from the group consisting of titanium and zirconium and z is 4.

8. A method according to claim 7, wherein the metal alkoxide is selected from the group consisting of tetraethyl titanate tetrapropyl titanate, tetrabutyl titanate and zirconium propoxide.

9. A method according to claim 8, wherein the organoalkoxysilane is γ-glycidoxypropyltrimethoxysilane.

10. A method according to claim 9, wherein the metal alkoxide is tetraethyl titanate, and the weight ratio of tetraethyl titanate to organoalkoxysilane is between 0.25 and 0.6.

* * * * *